United States Patent
Ogi et al.

(10) Patent No.: US 12,381,223 B2
(45) Date of Patent: Aug. 5, 2025

(54) ENERGY STORAGE DEVICE

(71) Applicant: GS Yuasa International Ltd., Kyoto (JP)

(72) Inventors: Kenta Ogi, Kyoto (JP); Kei Kumabayashi, Kyoto (JP); Akihiko Miyazaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 674 days.

(21) Appl. No.: 17/597,560

(22) PCT Filed: Jul. 21, 2020

(86) PCT No.: PCT/JP2020/028239
§ 371 (c)(1),
(2) Date: Jan. 11, 2022

(87) PCT Pub. No.: WO2021/015194
PCT Pub. Date: Jan. 28, 2021

(65) Prior Publication Data
US 2022/0271287 A1 Aug. 25, 2022

(30) Foreign Application Priority Data
Jul. 24, 2019 (JP) .................. 2019-136503

(51) Int. Cl.
*H01M 4/587* (2010.01)
*H01M 4/133* (2010.01)
(Continued)

(52) U.S. Cl.
CPC ........... *H01M 4/587* (2013.01); *H01M 4/133* (2013.01); *H01M 4/583* (2013.01);
(Continued)

(58) Field of Classification Search
CPC ...... H01M 4/587; H01M 4/133; H01M 4/583; H01M 10/0525; H01M 2004/021; H01M 2004/027
See application file for complete search history.

(56) References Cited

U.S. PATENT DOCUMENTS

2004/0023115 A1 2/2004 Kato et al.
2007/0128518 A1 6/2007 Uono et al.
(Continued)

FOREIGN PATENT DOCUMENTS

JP 2003-173778 A 6/2003
JP 2004-127913 A 4/2004
(Continued)

OTHER PUBLICATIONS

Machine translation of JP 2004-134175 (Year: 2024).*
(Continued)

*Primary Examiner* — Milton I Cano
*Assistant Examiner* — Albert Michael Hilton
(74) *Attorney, Agent, or Firm* — RANKIN, HILL & CLARK LLP

(57) ABSTRACT

One aspect of the present invention is an energy storage device including a negative electrode including a negative electrode substrate and a negative active material layer stacked directly or indirectly on at least one surface of the negative electrode substrate, the negative active material layer containing a negative active material, the negative active material containing hollow graphite particles having a median diameter D1 and solid graphite particles having a median diameter D2 smaller than the median diameter of the hollow graphite particles.

8 Claims, 4 Drawing Sheets

(51) Int. Cl.
*H01M 4/583* (2010.01)
*H01M 4/02* (2006.01)
*H01M 10/0525* (2010.01)

(52) U.S. Cl.
CPC .... *H01M 2004/021* (2013.01); *H01M 2004/027* (2013.01); *H01M 10/0525* (2013.01)

(56) References Cited

U.S. PATENT DOCUMENTS

| | | | |
|---|---|---|---|
| 2007/0275302 A1 | 11/2007 | Sotowa et al. | |
| 2008/0241685 A1* | 10/2008 | Hinoki | H01M 4/13 |
| | | | 429/209 |
| 2011/0193014 A1 | 8/2011 | Sotowa et al. | |
| 2014/0231707 A1 | 8/2014 | Sudoh et al. | |
| 2015/0162600 A1 | 6/2015 | Wakizaki et al. | |
| 2017/0084913 A1* | 3/2017 | Misaki | H01M 4/587 |
| 2018/0183061 A1* | 6/2018 | Obrovac | H01M 4/133 |
| 2019/0305317 A1 | 10/2019 | Cheng et al. | |

FOREIGN PATENT DOCUMENTS

| | | |
|---|---|---|
| JP | 2004-134175 A | 4/2004 |
| JP | 2004-253379 A | 9/2004 |
| JP | 2005-222933 A | 8/2005 |
| JP | 2005-259689 A | 9/2005 |
| JP | 2009-26514 A | 2/2009 |
| JP | 2009-245613 A | 10/2009 |
| JP | 2011-9051 A | 1/2011 |
| JP | 2011-48992 A | 3/2011 |
| JP | 2012-18933 A | 1/2012 |
| JP | 2012-23048 A | 2/2012 |
| JP | 2012-133981 A | 7/2012 |
| JP | 2013-211254 A | 10/2013 |
| JP | 2013-254746 A | 12/2013 |
| JP | 2014-212030 A | 11/2014 |
| JP | 2015-164127 A | 9/2015 |
| WO | 2013/051678 A1 | 4/2013 |
| WO | 2013/128829 A1 | 9/2013 |
| WO | 2014/003135 A1 | 1/2014 |
| WO | 2014024473 A1 | 2/2014 |
| WO | 2018/066110 A1 | 4/2018 |

OTHER PUBLICATIONS

Takamura, Tsutomu, et al. "Charge/discharge efficiency improvement by the incorporation of conductive carbons in the carbon anode of Li-ion batteries." Journal of power sources 90.1 (2000): 45-51. (Year: 2000).*

International Search Report (ISR) dated Oct. 13, 2020 filed in PCT/JP2020/028239.

* cited by examiner

ENERGY STORAGE DEVICE

TECHNICAL FIELD

The present invention relates to an energy storage device.

BACKGROUND ART

Nonaqueous electrolyte secondary batteries typified by lithium ion nonaqueous electrolyte secondary batteries are widely in use for electronic equipment such as personal computers and communication terminals, automobiles, and the like because the batteries have high energy density. The nonaqueous electrolyte secondary battery is generally provided with an electrode assembly, having a pair of electrodes electrically isolated by a separator, and a nonaqueous electrolyte interposed between the electrodes and is configured to charge and discharge by transferring ions between both the electrodes. Capacitors such as lithium ion capacitors and electric double-layer capacitors are also widely in use as energy storage devices except for the nonaqueous electrolyte secondary batteries.

For the purpose of increasing the energy density of the energy storage device and improving the charge-discharge efficiency, a carbon material having a large charge-discharge capacity, such as graphite, has been used as the negative active material of the energy storage device (see Patent Document 1).

PRIOR ART DOCUMENT

Patent Document

Patent Document 1: JP-A-2005-222933

SUMMARY OF THE INVENTION

Problems to be Solved by the Invention

In recent years, a negative electrode containing such a carbon material is required to have a further improved discharge capacity per volume. In this connection, by pressing a negative active material layer to enhance the density, the discharge capacity per volume of the negative active material layer can be increased. However, pressing of a negative active material layer at a high pressure may cause a problem that a negative electrode is significantly expanded by residual stress of the pressing at initial charge. There is a demand for an energy storage device including a negative electrode having a large discharge capacity per volume of a negative active material layer even in the case where there is no or little pressure applied to the negative active material layer.

The present invention has been made in view of the above circumstances, and an object of the present invention is to provide an energy storage device including a negative electrode having a high discharge capacity per volume of a negative active material layer even in the case where there is no or little pressure applied to the negative active material layer when graphite is used for a negative active material.

Means for Solving the Problems

One aspect of the present invention made to solve the above problems is an energy storage device which includes a negative electrode including a negative electrode substrate and a negative active material layer stacked directly or indirectly on at least one surface of the negative electrode substrate, the negative active material layer containing a negative active material, the negative active material containing hollow graphite particles having a median diameter $D1$ and solid graphite particles having a median diameter $D2$ which is smaller than that of the hollow graphite particles.

Advantages of the Invention

According to the present invention, it is possible to provide an energy storage device including a negative electrode having a high discharge capacity per volume of a negative active material layer even in the case where there is no or little pressure applied to the negative active material layer when graphite is used for a negative active material.

MODE FOR CARRYING OUT THE INVENTION

Figure 1:
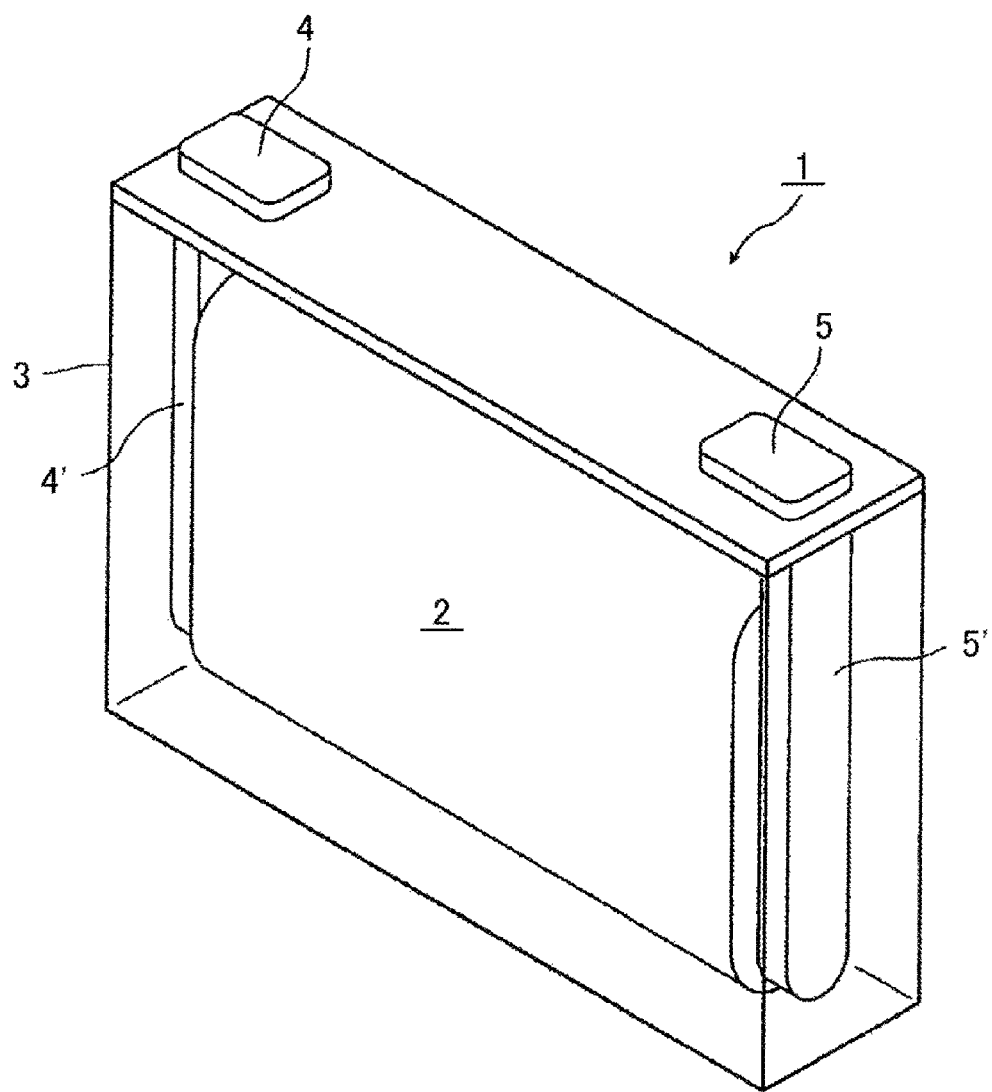
FIG. 1 is an external perspective view showing an energy storage device according to an embodiment of the present invention.

First, an outline of an energy storage device disclosed in the present specification will be described.

An energy storage device according to one aspect of the present invention includes a negative electrode including a negative electrode substrate and a negative active material layer stacked directly or indirectly on at least one surface of the negative electrode substrate, the negative active material layer containing a negative active material, the negative active material containing hollow graphite particles having a median diameter $D1$ and solid graphite particles having a median diameter $D2$ smaller than the median diameter of the hollow graphite particles.

In the energy storage device, the negative active material contains hollow graphite particles having a median diameter $D1$ and solid graphite particles having a median diameter $D2$ smaller than the median diameter of the hollow graphite particles, and consequently, the discharge capacity per volume of the negative active material layer in an unpressed state is higher as compared to a case where the negative active material layer contains only hollow graphite particles or solid graphite particles. Thus, a synergistic effect of the hollow graphite particles and the solid graphite particles can be obtained. Therefore, an energy storage device including a negative electrode excellent in discharge capacity per volume of a negative active material layer can be obtained without enhancing the density by high-pressure pressing.

Here, the content ratio of the hollow graphite particles to the total content of the hollow graphite particles and the solid graphite particles is preferably 80 mass % or less. When the content ratio of the hollow graphite particles to the total content of the hollow graphite particles and the solid graphite particles is 80 mass % or less, the discharge capacity per volume of the negative active material layer can be made higher.

Here, it is preferable that the negative active material layer is not substantially pressed. According to such a configuration, it is possible to increase the discharge capacity per volume of the negative active material layer while suppressing problems that may be caused by pressing the negative active material layer (e.g. expansion of the negative electrode that occurs at initial charge).

Here, the density of the negative active material layer is preferably 1.30 g/cm$^3$ or more and 1.55 g/cm$^3$ or less. In the energy storage device in which the density of the negative active material layer containing hollow graphite particles and solid graphite particles as the negative active material is 1.30 g/cm$^3$ or more and 1.55 g/cm$^3$ or less, the effect of application of the present configuration can be more suitably exhibited.

Here, where Q1 is the surface roughness of a region of the negative electrode substrate on which the negative active material layer is stacked, and Q2 is the surface roughness of a region of the negative electrode substrate on which the negative active material layer is not stacked, the ratio Q2/Q1 of Q2 to Q1 is preferably 0.90 or more. In the energy storage device in which Q2/Q1 in the negative electrode substrate is 0.90 or more, the effect of application of the present configuration can be more suitably exhibited.

Here, the median diameter of the solid graphite particles is preferably 4 μm or less. When the median diameter of the solid graphite particles is 4 μm or less, the above-described performance improving effect (e.g. an effect of increasing the discharge capacity per volume of the negative active material layer in an unpressed state) can be more effectively exhibited. In addition, the power of the energy storage device can be further improved.

Here, the aspect ratio of the solid graphite particle is preferably 1 or more and 5 or less. When the aspect ratio of the solid graphite particle is 1 or more and 5 or less, the above-described performance improving effect (e.g. an effect of increasing the discharge capacity per volume of the negative active material layer in an unpressed state) can be more sufficiently exhibited.

An energy storage device according to an embodiment of the present invention will be described in detail. The names of the constituent members (constituent elements) used in the embodiments may be different from the names of the constituent members (constituent elements) used in the background art.

<Energy Storage Device>

An energy storage device according to an embodiment of the present invention includes a positive electrode, a negative electrode and a nonaqueous electrolyte. The positive electrode and the negative electrode usually form an electrode assembly stacked or wound with a separator interposed therebetween. The electrode assembly is housed in a case, and the case is filled with the nonaqueous electrolyte. The nonaqueous electrolyte is interposed between the positive electrode and the negative electrode. A nonaqueous electrolyte secondary battery will be described as an example of such an energy storage device.

[Negative Electrode]

The negative electrode includes a negative electrode substrate and a negative active material layer stacked directly or indirectly on at least one surface of the negative electrode substrate. The negative electrode may include an intermediate layer disposed between the negative electrode substrate and the negative active material layer.

(Negative Electrode Substrate)

The negative electrode substrate has conductivity. As the material of the negative electrode substrate, a metal such as copper, nickel, stainless steel or a nickel-plated steel, or an alloy thereof is used. Among them, copper or a copper alloy is preferable. Example of the negative electrode substrate include foils and vapor deposition films, and foils are preferable from the viewpoint of cost. Therefore, the negative electrode substrate is preferably a copper foil or a copper alloy foil. Examples of the copper foil include rolled copper foils and electrolytic copper foils. Note that having "conductivity" means that the volume resistivity measured in accordance with JIS-H-0505 (1975) is 1×10$^7$ Ω·cm or less, and "non-conductive" means that the volume resistivity is more than 1×10$^7$ Ω·cm.

The average thickness of the negative electrode substrate is preferably 2 μm or more and 35 μm or less, more preferably 3 μm or more and 30 μm or less, still more preferably 4 μm or more and 25 μm or less, particularly preferably 5 μm or more and 20 μm or less. When the average thickness of the negative electrode substrate is within the above-described range, it is possible to enhance the energy density per volume of a secondary battery while increasing the strength of the negative electrode substrate. The "average thickness of the substrate" refers to a value obtained by dividing a cutout mass in cutout of a substrate having a predetermined area by a true density and a cutout area of the substrate.

(Negative Active Material Layer)

The negative active material layer is disposed along at least one surface of the negative electrode substrate directly or with an intermediate layer interposed therebetween. The negative active material layer contains a negative active material.

The negative active material disclosed herein contains hollow graphite particles having a median diameter D1 and solid graphite particles having a median diameter D2 smaller than the median diameter of the hollow graphite particles.

In this specification, the "graphite" is a carbon substance in which an average grid spacing d(002) of a (002) plane measured by an X-ray diffraction method before charge-discharge or in a discharged state is less than 0.34 nm.

In this specification, being "solid" means that the inside of the particle is dense and has substantially no void. More specifically, in the present specification, being "solid" means that in a cross section of a particle observed in a SEM image acquired by a scanning electron microscope (SEM), the area ratio excluding voids in the particle is 95% or more relative to the total area of the particle. In one preferred aspect, the area ratio of the solid graphite particles can be 97% or more (e.g. 99% or more). Being "hollow" means that in a cross section of a particle observed in a SEM image acquired by a SEM, the area ratio excluding voids in the particle is less than 95% relative to the total area of the particle. In one preferred aspect, the area ratio of the hollow graphite particles can be 92% or less (e.g. 90% or less).

The area ratio R of the graphite particle excluding voids in the particle relative to the total area of the particle can be determined in accordance with the following procedure.

(1) Preparation of Samples for Measurement

The powder of the graphite particles to be measured is fixed with a thermosetting resin. A cross-section polisher is used to expose the cross section of the graphite particles fixed with resin to produce a sample for measurement.

(2) Acquisition of SEM Image

For acquiring the SEM image, JSM-7001F (manufactured by JEOL Ltd.) is used as a scanning electron microscope. As the SEM image, a secondary electron image is observed. An acceleration voltage is 15 kV. An observation magnification is set so that the number of graphite particles appearing in one field of view is 3 or more and 15 or less. The obtained SEM image is stored as an image file. In addition, various conditions such as spot diameter, working distance, irradiation current, luminance, and focus are appropriately set so as to make the contour of the graphite particle clear.

(3) Cut-Out of Contour of Graphite Particle

The contour of the graphite particle is cut out from the acquired SEM image by using an image cutting function of an image editing software Adobe Photoshop™ Elements 11. The contour is cut out by using a quick selection tool to select the outside of the contour of the active material particle and edit a portion except for the graphite particle to a black background. At this time, when the number of the graphite particles from which the contours have been able to be cut out is less than three, the SEM image is acquired again, and the cutout is performed until the number of the graphite particles from which the contours have been able to be cut out becomes three or more.

(4) Binarization Processing

The image of the first graphite particle among the cut-out graphite particles is binarized by using image analysis software PopImaging 6.00™ to set to a threshold value a concentration 20% lower than a concentration at which the intensity becomes maximum. By the binarization processing, an area on the low-concentration side is calculated to obtain "an area S1 excluding voids in the particles".

Next, the image of the first graphite particle is binarized using a concentration 10 as a threshold value. The outer edge of the graphite particle is determined by the binarization processing, and the area inside the outer edge is calculated to obtain an "area S0 of the whole particle".

By calculating S1 relative to S0 (S1/S0) by using S1 and S0 calculated above, "an area ratio R1 excluding voids in the particles relative to the area of the entire particle" in the first graphite particle is calculated.

The images of the second and subsequent graphite particles among the cut-out graphite particles are also subjected to the binarization processing described above, and the areas S1 and S0 are calculated. Based on the calculated areas S1, S0, area ratios R2, R3, . . . of the respective graphite particles are calculated.

(5) Determination of Area Ratio R

By calculating the average value of all the area ratios R1, R2, R3, . . . calculated by the binarization processing, "the area ratio R of the graphite particles excluding voids in the particles relative to the total area of the particles" is determined.

(Median Diameter)

The median diameter D1 of the hollow graphite particles is not particularly limited as long as it is larger than the median diameter D2 of the solid graphite particles (i.e. D1>D2). D1 is normally, for example, 4 μm or more, usually 5 μm or more, typically 6 μm or more. D1 is preferably 7 μm or more, more preferably 7.5 μm or more. In some aspects, D1 may be 8 μm or more, or 10 μm or more (e.g. 12 μm or more). As the hollow graphite particles, those having a median diameter D1 of 20 μm or less can be preferably employed from the viewpoint of, for example, increasing the discharge capacity per volume of the negative active material layer in an unpressed state. For example, D1 is preferably 18 μm or less, more preferably 16 μm or less. In some aspects, D1 may be 14 μm or less, or 12 μm or less (e.g. 10 μm or less). The technique disclosed herein can be preferably carried out in an aspect in which the median diameter D1 of the hollow graphite particles is 4 μm or more and 20 μm or less (or 6 μm or more and 16 μm or less, particularly 8 μm or more and 14 μm or less).

On the other hand, the median diameter D2 of the solid graphite particles is not particularly limited as long as it is smaller than D1. From the viewpoint of, for example, increasing the discharge capacity per volume of the negative active material layer in an unpressed state, solid graphite particles having a median diameter D2 of less than 8 μm can be preferably employed. For example, D2 is preferably 6 μm or less, more preferably 4 μm or less. In some aspects, D2 may be 3.6 μm or less, or 3.4 μm or less (e.g. 3.2 μm or less). In addition, from the viewpoint of, for example, ease of handling at the time of production, or production cost, D2 is usually 0.5 μm or more, preferably 1 μm or more, more preferably 1.5 μm or more, still more preferably 2 μm or more. For example, the solid graphite particles may be those having a median diameter D2 of 2.5 μm or more (e.g. 2.8 μm or more). From the viewpoint of, for example, achieving both the above-described discharge capacity and ease of production, the solid graphite particles are preferably those having a median diameter D2 of 0.5 μm or more and less than 8 μm, more preferably those having a median diameter D2 of 1.5 μm or more and 5 μm or less, particularly preferably those having a median diameter D2 of 2 μm or more and 4 μm or less.

From the viewpoint of more sufficiently exhibiting the effect of combined use of the hollow graphite particles and the solid graphite particles, it is preferable that D1 and D2 satisfy the relationship of $1<(D1/D2)<10$. By using the hollow graphite particles and the solid graphite particles in combination so as to obtain a specific median diameter ratio, the effect of increasing the discharge capacity per volume of the negative active material layer in an unpressed state at a higher level. For example, the technique disclosed herein can be preferably carried out in an aspect in which D1 and D2 satisfy the relationship of $1.5 \leq (D1/D2) \leq 8$, more preferably $1.8 \leq (D1/D2) \leq 6$, still more preferably $2 \leq (D1/D2) \leq 5.2$, particularly preferably $2.5 \leq (D1/D2) \leq 4.8$. In some aspects, D1 and D2 may satisfy the relationship of, for example, $(D1/D2) \leq 4$, typically $(D1/D2) \leq 3.5$ (e.g. $(D1/D2) \leq 3$).

A value obtained by subtracting D2 from D1 (i.e. D1−D2) is preferably 2 μm or more, more preferably 4 μm or more. D1−D2 is preferably 18 μm or less, more preferably 15 μm or less, still more preferably 12 μm or less. For example, D1−D2 may be 10 μm or less, or 6 μm or less.

Note that in the present specification, the "median diameter" means a value (D50) at which the volume-based integrated distribution calculated in accordance with JIS-Z-8819-2 (2001) becomes 50%. Specifically, the measured value can be obtained by the following method. A laser diffraction type particle size distribution measuring apparatus ("SALD-2200" manufactured by Shimadzu™ Corporation) is used as a measuring apparatus, and Wing SALD-2200 is used as measurement control software. A scattering measurement mode is adopted, and a wet cell, in which a dispersion liquid with a measurement sample dispersed in a dispersion solvent circulates, is irradiated with a laser beam to obtain a scattered light distribution from the measurement sample. The scattered light distribution is approximated by a log-normal distribution, and a particle size corresponding to an accumulation degree of 50% is defined as a median diameter (D50).

(Aspect Ratio)

The aspect ratio As1 of the hollow graphite particles disclosed herein is not particularly limited. Hollow graphite particles having an aspect ratio As1 of 1 or more are usually used. The aspect ratio As1 is normally 1.1 or more, for example 1.2 or more. In some aspects, the aspect ratio As1 may be 1.4 or more. In addition, the aspect ratio As1 of the hollow graphite particles is normally about 5.0 or less, preferably 4.0 or less, more preferably 3.0 or less, particularly preferably 2.0 or less (e.g. 1.8 or less). In some aspects, the aspect ratio As1 may be 1.5 or less, or 1.3 or less. When the aspect ratio As1 of the hollow graphite particles is within the above-described range, the discharge capacity per volume of the negative active material layer in an unpressed state can be more effectively increased.

The aspect ratio As2 of the solid graphite particles disclosed herein is not particularly limited, and the lower limit thereof is 1.0, preferably 1.2. From the viewpoint of, for example, enhancing the packing property of the negative active material, solid graphite particles having an aspect ratio As2 of 1.5 or more can be preferably employed as the solid graphite particles in the negative active material layer in the aspect described above. In some embodiments, the aspect ratio As2 of the solid graphite particles is preferably, for example, 2 or more, and may typically be 2.5 or more. On the other hand, the upper limit of the aspect ratio As2 of the solid graphite particles is 5.0, preferably 4.5. For example, graphite particles having an aspect ratio As2 of 4.0 or less are preferable, graphite particles having an aspect ratio As2 of 3.5 or less are more preferable, and graphite particles having an aspect ratio As2 of 3.2 or less (e.g. 3.0 or less) are particularly preferable. When the aspect ratio As2 of the solid graphite particles is within the above-described range, the discharge capacity per volume of the negative active material layer in an unpressed state can be more effectively increased. In addition, since the graphite particles are close to a spherical shape or a spindle shape, so that current concentration is less likely to occur, uneven expansion of the negative electrode can be suppressed. Further, since the shape is close to a spherical shape or a spindle shape, adjacent graphite particles are hardly caught by each other, and the graphite particles are moderately slid over each other, so that even if the graphite particles expand, they are maintained in a state close to closest packing. Thus, even if the graphite particles expand, the particles expand relatively uniformly and moderately slide over each other, so that a negative active material layer having a high packing ratio of the graphite particles is maintained, and as a result, the expansion of the negative electrode which occurs at initial charge can be suppressed.

In one preferred aspect, the aspect ratio As2 of the solid graphite particles is larger than the aspect ratio As1 of the hollow graphite particles. It is preferable that As1 and As2 satisfy the relationship of $1<(As2/As1)\leq 5$. For example, the technique disclosed herein can be preferably carried out in an aspect in which As1 and As2 satisfy the relationship of $1.2\leq(As2/As1)\leq 4$, more preferably $1.5\leq(As2/As1)\leq 3$. A value obtained by subtracting As1 from As2 (i.e. As2−As1) is preferably 0.5 or more, more preferably 1 or more. As2−As1 is preferably 3 or less, more preferably 2.5 or less, still more preferably 2 or less. By using the hollow graphite particles and the solid graphite particles in combination so as to obtain a specific ratio (As2/As1), the above-described effect can be more sufficiently exhibited.

In the present specification, the "aspect ratio" means the A/B value that is the ratio of the longest diameter A of the particle to the longest diameter B in the direction perpendicular to the diameter A in the cross section of the particle observed in the SEM image by the scanning electron microscope. The aspect ratio can be determined as follows.
(1) Preparation of Samples for Measurement A sample for measurement having an exposed cross section used for determining the area ratio R1 described above is used.
(2) Acquisition of SEM Image For acquiring the SEM image, JSM-7001F (manufactured by JEOL Ltd.) is used as a scanning electron microscope. As the SEM image, a secondary electron image is observed. An acceleration voltage is 15 kV. An observation magnification is set so that the number of graphite particles appearing in one field of view is 100 or more and 1000 or less. The obtained SEM image is stored as an image file. In addition, various conditions such as spot diameter, working distance, irradiation current, luminance, and focus are appropriately set so as to make the contour of the graphite particle clear.
(3) Determination of Aspect Ratio From the acquired SEM image, 100 graphite particles are randomly selected, and for each of the particles, the longest diameter A of the graphite particle and the longest diameter B in the direction perpendicular to the diameter A are measured to calculate the A/B value. The average value of all the calculated A/B values is calculated to determine the aspect ratio of the graphite particles.
(Type of Graphite Particles)

As each of the hollow graphite particle and the solid graphite particle, one having an appropriate median diameter and shape can be appropriately selected from various known graphite particles, and used. Examples of the known graphite particles include natural graphite particles and artificial graphite particles. Here, the natural graphite is a generic term for graphite which can be taken from natural minerals, and the artificial graphite is a generic term for artificially produced graphite.

Specific examples of the graphite particles that can be preferably employed as the hollow graphite particles include natural graphite particles. Such natural graphite particles have high crystallinity, and can effectively contribute to improvement of the discharge capacity per volume of the negative active material layer of the energy storage device. Specific examples of the natural graphite particles include particles of scale-like graphite, massive graphite (flake graphite), and earthy graphite. In one preferred aspect, the hollow graphite particles may be flat natural graphite particles having a scale-like shape or spheroidized natural graphite particles obtained by spheroidizing the scale-like graphite. As the solid graphite particles, natural graphite particles having a median diameter smaller than that of the hollow graphite particles may be used, or artificial graphite particles may be used. The solid graphite particles do not have a cavity inside, and are packed in gaps between the hollow graphite particles, and thus the solid graphite particles can contribute to an increase in bulk density of the negative active material layer (coating density in an unpressed state). The hollow graphite particles and the solid graphite particles may be composite particles in which the graphite particles are combined with particles formed of another material (e.g. another carbon material or Si compound), or may be non-composite particles in which the graphite particles are not combined with other particles as mentioned above. The hollow graphite particles and the solid graphite particles disclosed herein can be preferably used in the form of non-composite particles in which the graphite particles are not bound to particles formed of another material. The hollow graphite particles and the solid graphite particles may be graphite particles, the surfaces of which are coated (for example, with amorphous carbon coat).

In one preferred aspect, the hollow graphite particles and the solid graphite particles can be selected in such a manner that the R value of the hollow graphite particles (R1) is smaller than the R value of the solid graphite particles (R2) (R1<R2). Here, the "R value" is the ratio of the peak intensity ($I_{D1}$) of the D band to the peak intensity ($I_{G1}$) of the G band ($I_{D1}/I_{G1}$) in the Raman spectrum. For example, the hollow graphite particles and the solid graphite particles can be selected in such a manner that the R value of the solid graphite particles (R2) and the R value of the hollow graphite particles (R1) satisfy the relationship of 1<(R2/R1)≤4, more preferably 1.2≤(R2/R1)≤3, still more preferably 1.3≤(R2/R1)≤2.5, for example 1.4≤(R2/R1)≤2.2. In an energy storage device including a negative active material layer containing hollow graphite particles and solid graphite particles having such R values (R1 and R2), the effect of application of the present aspect can be more suitably exhibited. For example, when natural graphite particles are used as the hollow graphite particles, various artificial graphite particles can be preferably employed as the solid graphite particles.

The R value of the hollow graphite particles (R1) is normally less than about 0.25 (e.g. 0.05 or more and less than 0.25), preferably 0.23 or less (e.g. 0.1 or more and 0.23 or less), more preferably 0.22 or less (e.g. 0.12 or more and 0.22 or less), still more preferably 0.21 or less. In some aspects, R1 of the hollow graphite particles may be 0.20 or less, or 0.18 or less. The R value of the solid graphite particles (R2) can be generally 0.25 or more (e.g. 0.25 or more and 0.8 or less), and is, for example, 0.28 or more (e.g. 0.28 or more and 0.7 or less), typically 0.3 or more (e.g. 0.3 or more and 0.6 or less). In some aspects, R2 of the solid graphite particles may be 0.5 or less, or 0.4 or less.

Here, the "Raman spectrum" is obtained by performing Raman spectrometry under the conditions of a wavelength of 532 nm (YAG laser), a grating of 600 g/mm, and a measurement magnification of 100 times using "HRRevolution™" manufactured by HORIBA™, Ltd. Specifically, first, Raman spectrometry is performed over the range of 200 $cm^{-1}$ to 4000 cm 1, and the obtained data is normalized by the maximum intensity (e.g. the intensity of the G band) in the measurement range with the minimum value at 4000 $cm^{-1}$ as a base intensity. Next, using a Lorentz function, fitting is performed on the obtained curve to calculate the intensities of the G band near 1580 $cm^{-1}$ and the D band near 1350 $cm^{-1}$, which are defined as "peak intensity of G band ($I_{G1}$)" and "peak intensity of D band ($I_{D1}$)", respectively, in the Raman spectrum.

The hollow graphite particles and the solid graphite particles may be, for example, spherical or non-spherical. Specific examples of the non-spherical shape include a spindle shape (e.g. an elliptic type and an ovoid shape), a scale-like shape and a plate shape. As the solid graphite particles, those having a spindle shape can be particularly preferably employed. The hollow graphite particles and the solid graphite particles may have irregularities on the surface. The hollow graphite particles and the solid graphite particles may include particles in which a plurality of graphite particles are aggregated.

The content ratio of the hollow graphite particles to the total content of the hollow graphite particles and the solid graphite particles is not particularly limited. The upper limit of the content ratio is preferably 90 mass %, more preferably 80 mass %, still more preferably 75 mass %. On the other hand, the lower limit of the content ratio of the hollow graphite particles is preferably 10 mass %, more preferably 20 mass %, still more preferably 30 mass % (e.g. 40 mass %). The technology disclosed herein can be preferably implemented in an aspect in which a content ratio of the hollow graphite particles to a total content of the hollow graphite particles and the solid graphite particles is 10 mass % or more and 80 mass % or less (Furthermore, 25 mass % or more and 65 mass % or less, particularly 50 mass % or more and 70 mass % or less). When the content ratio of the hollow graphite particles to the total content of the hollow graphite particles and the solid graphite particles is within the above-described range, the discharge capacity per volume of the negative active material layer can be made higher.

(Other Negative Active Materials)

The negative active material layer disclosed herein may contain graphite particles other than the hollow graphite particles and the solid graphite particles (hereinafter, the graphite particles are referred to as third graphite particles) as long as the effects of the present invention are not impaired. The third graphite particles can be appropriately selected from various known graphite particles, and used. The shape of the third graphite particles is not particularly limited, and is preferably a shape close to a spherical shape or a spindle shape which has an aspect ratio of 2 or more and 5 or less. When the third graphite particles are contained, the total mass of the hollow graphite particles and the solid graphite particles is normally 70 mass % or more, preferably 80 mass % or more, and more preferably 90 mass % or more, of the total mass of graphite particles contained in the negative active material layer. In particular, an energy storage device is preferable in which the hollow graphite particles and the solid graphite particles constitute 100 mass % of the graphite particles contained in the negative active material layer. Thus, when the graphite particles including substantially only two types of graphite particles: the hollow graphite particles and the solid graphite particles are used, it is possible to more efficiently exhibit the above-described effects while taking advantage of using the hollow graphite particles and the solid graphite particles. The negative active material layer disclosed herein may contain a carbonaceous active material (hereinafter, referred to as a non-graphitized carbonaceous active material) other than the hollow graphite particles, the solid graphite particles and the third graphite particles as long as the effects of the present invention are not impaired. Examples of the non-graphitized carbonaceous active material include hardly graphitizable carbon and easily graphitizable carbon. Here, the term "hardly graphitizable carbon" refers to a carbon material in which the average grid distance of the (002) plane (d(002)) determined by the X-ray diffraction method before charge-discharge or in the discharged state is 0.36 nm or more and 0.42 nm or less. The "easily graphitizable carbon" refers to a carbon material in which the d002 is 0.34 nm or more and less than 0.36 nm. When the non-graphitized carbonaceous active material is contained, the total mass of the hollow graphite particles and the solid graphite particles is normally 70 mass % or more, preferably 80 mass % or more, and more preferably 90 mass % or more, of the total mass of the carbonaceous active material contained in the negative active material layer. In particular, an energy storage device is preferable in which the hollow graphite particles and the solid graphite particles constitute 100 mass % of the carbonaceous active material contained in the negative active material layer.

The negative active material layer disclosed herein may contain a negative active material (hereinafter, referred to as a non-carbonaceous active material) formed of a material other than the carbonaceous active material as long as the effects of the present invention are not impaired. Examples of the non-carbonaceous active material include semimetals such as Si, metals such as Sn, oxides of these metals, or composites of any of these metals and carbon materials. The content of the non-carbonaceous active material is normally, for example, 30 mass % or less, preferably 20 mass % or less, more preferably 10 mass % or less, of the total mass of the negative active material contained in the negative active material layer. The technique disclosed herein can be preferably carried out in an aspect in which the total ratio of the carbonaceous active material to the total mass of the negative active material contained in the negative active material layer is more than 90 mass %. The ratio of the carbonaceous active material is more preferably 95 mass % or more, still more preferably 98 mass % or more, particularly preferably 99 mass % or more. In particular, an energy storage device is preferable in which the carbonaceous active material constitutes 100 mass % of the negative active material contained in the negative active material layer.

(Optional Components)

The negative active material layer disclosed herein contains optional components such as a conductive agent, a binder (binding agent), a thickener, a filler and the like if necessary.

The hollow graphite particles and the solid graphite particles also have conductivity, and examples of the conductive agent include carbonaceous materials, metals, and conductive ceramics. Examples of the carbonaceous material include graphitized carbon, non-graphitized carbon and graphene-based carbon. Examples of the non-graphitized carbon include carbon nanofibers, pitch-based carbon fibers and carbon black. Examples of the carbon black include furnace black, acetylene black and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly, or two or more of these materials may be mixed and used. In addition, these materials may be composited and used. For example, a material obtained by compositing carbon black with CNT may be used. Among them, carbon black is preferable, an in particular, acetylene black is preferable, from the viewpoint of electron conductivity and coatability. When a conductive agent is used in the negative active material layer, the ratio of the conductive agent to the entire negative active material layer can be about 8.0 mass % or less, and is preferably usually about 5.0 mass % or less (e.g. 1.0 mass % or less). The technique disclosed herein can be preferably carried out in an aspect in which the negative active material layer does not contain a conductive agent.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as ethylene-propylene-diene rubber (EPDM), sulfonated EPDM, styrene-butadiene rubber (SBR), and fluororubber; and polysaccharide polymers.

The content of the binder in the negative active material layer is preferably 1 mass % or more and 10 mass % or less, more preferably 3 mass % or more and 9 mass % or less. When the content of the binder is within the above-described range, the negative active material particles can be stably held.

Examples of the thickener include polysaccharide polymers such as carboxymethylcellulose (CMC) and methylcellulose. When the thickener has a functional group reactive with lithium and the like, the functional group may be deactivated by methylation or the like in advance.

The filler is not particularly limited. Examples of the main component of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof. When a filler is used in the negative active material layer, the ratio of the filler to the entire negative active material layer can be about 8.0 mass % or less, and is preferably usually about 5.0 mass % or less (e.g. 1.0 mass % or less). The technique disclosed herein can be preferably carried out in an aspect in which the negative active material layer does not contain a filler. In the present specification, the "main component" refers to a component having the highest content, for example, a component containing 50 mass % or more relative to the total mass.

It is preferable that the negative active material layer disclosed herein is not substantially pressed. If pressing is performed, the negative electrode may be significantly expanded by the residual stress of the pressing at initial charge. Since the negative active material layer containing hollow graphite particles and solid graphite particles as the negative active material is not substantially pressed, little stress is applied to the negative active material until formation of an electrode assembly. Thus, the graphite particles themselves have little residual stress, so that it is possible to suppress uneven expansion of the negative electrode due to release of the residual stress. Therefore, it is possible to suppress expansion of the negative electrode which occurs at initial charge.

Here, the phrase "not substantially pressed" means that a step of applying a pressure (linear pressure) of 10 kgf/mm or more to the negative active material layer by an apparatus intended for applying a pressure to a workpiece, such as a roll press, is not carried out during production. That is, the phrase "not substantially pressed" also includes a case where a slight pressure is applied to the negative active material layer in other steps such as a step of unwinding the negative electrode. The phrase "not substantially pressed" includes a case where a step of applying a pressure (linear pressure) of less than 10 kgf/mm is carried out.

The density of the negative active material layer is not particularly limited, and the lower limit thereof is preferably 1.30 g/cm$^3$, more preferably 1.35 g/cm$^3$, still more preferably 1.40 g/cm$^3$. On the other hand, the upper limit of the density of the negative active material layer is preferably 1.55 g/cm$^3$, more preferably 1.50 g/cm$^3$. In some aspects, the density of the negative active material layer may be 1.48 g/cm$^3$ or less, or 1.45 g/cm$^3$ or less. When the density of the negative active material layer is within the above-described range, the graphite particles themselves have little residual stress, so that it is possible to suppress uneven expansion of the negative electrode due to release of the residual stress. It is presumed that in the energy storage device, even if the graphite particles expand, the particles expand relatively uniformly, so that a negative active material layer having a high packing ratio of the graphite particles is maintained, and as a result, the expansion of the negative electrode which occurs at initial charge can be suppressed.

Here, where Q1 is the surface roughness of a region of the negative electrode substrate on which the negative active material layer is stacked, and Q2 is a surface roughness of a region of the negative electrode substrate on which the negative active material layer is not stacked, the lower limit of the ratio Q2/Q1 of Q2 to Q1 is preferably 0.90, more preferably 0.92, still more preferably 0.94. When the pressure applied to the negative electrode substrate increases, the D2/Q1 decreases because the surface roughness of a region where the negative active material layer is formed becomes larger. In other words, in the negative electrode substrate, the values of surface roughness of a region where the negative active material layer is disposed and a region where the negative active material layer is not disposed (so-called an exposed region of the negative electrode substrate) are almost the same when a pressure is not applied. That is, Q2/Q1 becomes close 1. In the energy storage device, there is no or little pressure applied to the negative active material layer when the Q2/Q1 is 0.90 or more. Thus, the graphite particles themselves have little residual stress, so that it is possible to suppress uneven expansion of the negative electrode due to release of the residual stress. Thus, it is presumed that in the energy storage device, even if the graphite particles expand, the particles expand relatively uniformly, so that a negative active material layer having a high packing ratio of the graphite particles is maintained, and as a result, the expansion of the negative electrode which occurs at initial charge can be suppressed. On the other hand, the upper limit of the ratio Q2/Q1 of surface roughness is usually 1. In some aspects, the ratio Q2/Q1 of surface roughness ratio may be 0.99 or less, or 0.98 or less.

The "surface roughness" means a value obtained by measuring the center line roughness Ra of a surface (for a region where the active material layer is formed, a surface after the active material layer is removed) of the substrate with a laser microscope in accordance with JIS-B0601 (2013).

(Intermediate Layer)

The intermediate layer is a coating layer on the surface of the negative electrode substrate, and contains conductive particles such as carbon particles to reduce contact resistance between the negative electrode substrate and the negative active material layer. The configuration of the intermediate layer is not particularly limited but can be formed of, for example, a composition containing a resin binder and conductive particles. The technique disclosed herein can be preferably carried out in an aspect in which the intermediate layer is not present.

[Positive Electrode]

The positive electrode has a positive electrode substrate and a positive active material layer. The positive active material layer contains a positive active material. The positive active material layer is stacked along at least one surface of the positive electrode substrate directly or with an intermediate layer interposed therebetween.

The positive electrode substrate has conductivity. As the material of the substrate, a metal such as aluminum, titanium, tantalum, stainless steel, or an alloy thereof is used. Among these, aluminum and aluminum alloys are preferable from the viewpoint of the balance of electric potential resistance, high conductivity, and cost. Examples of the form of the positive electrode substrate include a foil and a vapor deposition film, and a foil is preferred from the viewpoint of cost. That is, an aluminum foil is preferable as the positive electrode substrate. Note that examples of the aluminum or aluminum alloy include A1085P, A3003 and the like specified in JIS-H-4000 (2014).

The positive active material layer is formed of a so-called positive composite containing a positive active material. The positive composite forming the positive active material layer contains optional components such as a conductive agent, a binder, a thickener, a filler, or the like as necessary.

The positive active material can be appropriately selected from, for example, known positive active materials. As a positive active material for a lithium ion secondary battery, a material capable of storing and releasing lithium ions is normally used. Examples of the positive active material include lithium transition metal composite oxides having an α-NaFeO$_2$-type crystal structure, lithium transition metal oxides having a spinel-type crystal structure, polyanion compounds, chalcogenides, and sulfur. Examples of the lithium transition metal composite oxide having an α-NaFeO$_2$-type crystal structure include Li[Li$_x$Ni$_{1-x}$]O$_2$ (0≤x<0.5), Li[Li$_x$Ni$_y$Co$_{(1-x-y)}$]O$_2$ (0≤x<0.5, 0<y<1), Li[Li$_x$Co$_{(1-x)}$]O$_2$ (0≤x<0.5), Li[Li$_x$Ni$_y$Mn$_{(1-x-y)}$]O$_2$ (0≤x<0.5, 0<y<1), Li[Li$_x$Ni$_y$Mn$_\beta$Co$_{(1-x-y-\beta)}$]O$_2$ (0≤x<0.5, 0<y, 0<β, 0.5<y+β<1), and Li[Li$_x$Ni$_y$Co$_\beta$Al$_{(1-x-y-\beta)}$]O$_2$ (0≤x<0.5, 0<y, 0<β, 0.5<y+β<1). Examples of the lithium transition metal oxide having a spinel-type crystal structure include Li$_x$Mn$_2$O$_4$ and Li$_x$Ni$_y$Mn$_{(2-y)}$O$_4$. Examples of the polyanion compound include LiFePO$_4$, LiMnPO$_4$, LiNiPO$_4$, LiCoPO$_4$, Li$_3$V$_2$(PO$_4$)$_3$, Li$_2$MnSiO$_4$ and Li$_2$CoPO$_4$F. Examples of the chalcogenide include titanium disulfide, molybdenum disulfide and molybdenum dioxide. Atoms or polyanions in these materials may be partially substituted with atoms or anion species composed of other elements. The surfaces of these materials may be covered with other materials. In the positive active material layer, one of these materials may be used singly, or two or more of these materials may be mixed and used. In the positive active material layer, one of these compounds may be used alone, or two or more compounds may be mixed. The content of the positive active material in the positive active material layer is not particularly limited, and the lower limit thereof is preferably 50 mass %, more preferably 80 mass %, still more preferably 90 mass %. On the other hand, the upper limit of the content is preferably 99% by mass, and more preferably 98% by mass.

The conductive agent is not particularly limited so long as being a conductive material. Such a conductive agent can be selected from the materials exemplified for the negative electrode. When a conductive agent is used, the ratio of the conductive agent to the entire positive active material layer can be about 1.0 mass % or more and 20 mass % or less, and is preferably usually about 2.0 mass % or more and 15 mass % or less (e.g. 3.0 mass % or more and 6.0 mass % or less).

Examples of the binder include: thermoplastic resins such as fluororesin (polytetrafluoroethylene (PTFE), polyvinylidene fluoride (PVDF), etc.), polyethylene, polypropylene, and polyimide; elastomers such as ethylene-propylene-diene rubber (EPDM), sulfonated EPDM, styrene-butadiene rubber (SBR), and fluororubber; and polysaccharide polymers. When a binder is used, the ratio of the binder to the entire positive active material layer can be about 0.50 mass % or more and 15 mass % or less, and is preferably usually about 1.0 mass % or more and 10 mass % or less (e.g. 1.5 mass % or more and 3.0 mass % or less).

Examples of the thickener include polysaccharide polymers such as carboxymethylcellulose (CMC) and methylcellulose. When the thickener has a functional group reactive with lithium, it is preferable to deactivate the functional group by methylation or the like in advance. When a thickener is used, the ratio of the thickener to the entire positive active material layer can be about 8 mass % or less, and is preferably usually about 5.0 mass % or less (e.g. 1.0 mass % or less). The technique disclosed herein can be preferably carried out in an aspect in which the positive active material layer does not contain a thickener.

The filler can be selected from the materials exemplified for the negative electrode. When a filler is used, the ratio of the filler to the entire positive active material layer can be about 8.0 mass % or less, and is preferably usually about 5.0 mass % or less (e.g. 1.0 mass % or less). The technique disclosed herein can be preferably carried out in an aspect in which the positive active material layer does not contain a filler.

The intermediate layer is a coating layer on the surface of the positive electrode substrate, and contains conductive particles such as carbon particles to reduce contact resistance between the positive electrode substrate and the positive active material layer. Similarly to the negative electrode, the configuration of the intermediate layer is not particularly limited but can be formed of, for example, a composition containing a resin binder and conductive particles. The technique disclosed herein can be preferably carried out in an aspect in which the intermediate layer is not present.

[Separator]

As the separator, for example, a woven fabric, a nonwoven fabric, a porous resin film, or the like is used. Among these, a porous resin film is preferable from the viewpoint of strength, and a nonwoven fabric is preferable from the viewpoint of liquid retention of the nonaqueous electrolyte. As a main component of the separator, a polyolefin such as polyethylene or polypropylene is preferable from the viewpoint of strength, and polyimide, aramid or the like is preferable from the viewpoint of resistance to oxidation and decomposition. These resins may be composited.

Note that an inorganic layer may be stacked between the separator and the electrode (usually, the positive electrode). The inorganic layer is a porous layer also called a heat resistant layer or the like. A separator having an inorganic layer formed on one surface both surfaces of the porous resin film can also be used. The inorganic layer is usually made up of inorganic particles and a binder and may contain other components.

[Nonaqueous Electrolyte]

As the nonaqueous electrolyte, a known nonaqueous electrolyte normally used for a general nonaqueous electrolyte secondary battery (energy storage device) can be used. The nonaqueous electrolyte contains a nonaqueous solvent and an electrolyte salt dissolved in the nonaqueous solvent. The nonaqueous electrolyte may be a solid electrolyte or the like.

As the nonaqueous solvent, it is possible to use a known nonaqueous solvent usually used as a nonaqueous solvent of a general nonaqueous electrolyte for an energy storage device. Examples of the nonaqueous solvent include cyclic carbonate, chain carbonate, ester, ether, amide, sulfone, lactone, and nitrile. Among these, it is preferable to use at least the cyclic carbonate or the chain carbonate, and it is more preferable use the cyclic carbonate and the chain carbonate in combination. When the cyclic carbonate and the chain carbonate are used in combination, the volume ratio of the cyclic carbonate to the chain carbonate (cyclic carbonate:chain carbonate) is not particularly limited but is preferably from 5:95 to 50:50, for example.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these, EC is preferable.

Examples of the chain carbonate include diethyl carbonate (DEC), dimethyl carbonate (DMC), ethyl methyl carbonate (EMC), and diphenyl carbonate, and among these, EMC is preferable.

As the electrolyte salt, it is possible to use a known electrolyte salt usually used as an electrolyte salt of a general nonaqueous electrolyte for an energy storage device. Examples of the electrolyte salt include a lithium salt, a sodium salt, a potassium salt, a magnesium salt, and an onium salt, but a lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a hydrocarbon group in which hydrogen is replaced by fluorine, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these, an inorganic lithium salt is preferable, and $LiPF_6$ is more preferable.

The lower limit of the concentration of the electrolyte salt in the nonaqueous electrolyte is preferably 0.1 mol/dm$^3$, more preferably 0.3 mol/dm$^3$, still more preferably 0.5 mol/dm$^3$, particularly preferably 0.7 mol/dm$^3$. On the other hand, the upper limit is not particularly limited, and is preferably 2.5 mol/dm$^3$, more preferably 2.0 mol/dm$^3$, still more preferably 1.5 mol/dm$^3$.

Other additives may be added to the nonaqueous electrolyte. As the nonaqueous electrolyte, a salt that is melted at normal temperature, an ionic liquid, or the like can also be used.

[Specific Configuration of Energy Storage Device]

The shape of the energy storage device of the present embodiment is not particularly limited, and examples thereof include cylindrical batteries, laminated film batteries, prismatic batteries, flat batteries, coin batteries and button batteries.

FIG. 1 shows an energy storage device 1 (nonaqueous electrolyte energy storage device) as an example of a prismatic battery. FIG. 1 is a view showing an inside of a case in a perspective manner. An electrode assembly 2 having a positive electrode and a negative electrode which are wound with a separator interposed therebetween is housed in a prismatic case 3. The positive electrode is electrically connected to a positive electrode terminal 4 through a positive electrode lead 4'. The negative electrode is electrically connected to a negative electrode terminal 5 through a negative electrode lead 5'.

In the energy storage device, it is possible to provide an energy storage device including a negative electrode having a high discharge capacity per volume of a negative active material layer even in the case where there is no or little pressure applied to the negative active material layer when graphite is used for a negative active material.

[Method for Producing Energy Storage Device]

A method for producing the energy storage device of the present embodiment can be appropriately selected from known methods. The production method includes, for example, preparing an electrode assembly, preparing a nonaqueous electrolyte, and housing the electrode assembly and the nonaqueous electrolyte in a case. The preparation of the electrode assembly includes: preparing a positive electrode and a negative electrode, and forming an electrode assembly by stacking or winding the positive electrode and the negative electrode with a separator interposed therebetween. In the method for producing the energy storage device of the present embodiment, a negative active material containing hollow graphite particles having a median diameter D1 and solid graphite particles having a median diameter D2 smaller than the median diameter of the hollow graphite particles is used in the step of preparing a negative electrode.

In the step of preparing a negative electrode, a negative active material layer containing a negative active material containing hollow graphite particles and solid graphite particles is stacked along at least one surface of a negative electrode substrate by, for example, applying a negative composite to the negative electrode substrate. Specifically, for example, a negative composite is applied to the negative electrode substrate, and dried to stack the negative active material layer. After the drying, pressing may be performed in an average thickness direction of the negative active material layer. The pressure (linear pressure) during pressing is not particularly limited, and is normally about 25 kgf/mm or less, preferably 20 kgf/mm or less, more preferably 16 kgf/mm or less, still more preferably 12 kgf/mm or less from the viewpoint of suppressing expansion of the negative electrode which occurs at initial charge. In one preferred aspect, the negative active material layer is not pressed before the negative electrode and the positive electrode are stacked. That is, the negative active material layer is disposed on the negative electrode substrate in a "substantially unpressed" state.

The step of housing the nonaqueous electrolyte in a case can be appropriately selected from known methods. For example, when a nonaqueous electrolyte solution is used for the nonaqueous electrolyte, the nonaqueous electrolyte solution may be injected from an inlet formed in the case, followed by sealing the inlet. The details of each of other elements forming the energy storage device obtained by the production method are as described above.

Other Embodiments

The energy storage device of the present invention is not limited to the embodiments described above, and various changes may be made without departing from the scope of the present invention. For example, to the configuration of an embodiment, the configuration of another embodiment can be added, and a part of the configuration of an embodiment can be replaced by the configuration of another embodiment or a well-known technique. Further, a part of the configuration of an embodiment can be deleted. In addition, a well-known technique can be added to the configuration of an embodiment.

In the above embodiment, the energy storage device is a nonaqueous electrolyte secondary battery, but other energy storage devices may be used. Examples of the other energy storage devices include capacitors (electric double-layer capacitor, lithium ion capacitor). Examples of the nonaqueous electrolyte secondary battery include a lithium ion nonaqueous electrolyte secondary battery.

The present invention can also be realized as an energy storage apparatus including a plurality of the energy storage devices. An assembled battery can be constituted using one or a plurality of energy storage devices (cells) of the present invention, and an energy storage apparatus can be constituted using the assembled battery. The energy storage apparatus can be used as a power source for an automobile, such as an electric vehicle (EV), a hybrid vehicle (HEV), or a plug-in hybrid vehicle (PHEV). Further, the energy storage apparatus can be used for various power supply apparatuses such as an engine starting power supply apparatus, an auxiliary power supply apparatus, and an uninterruptible power systems (UPSs).

Figure 2:
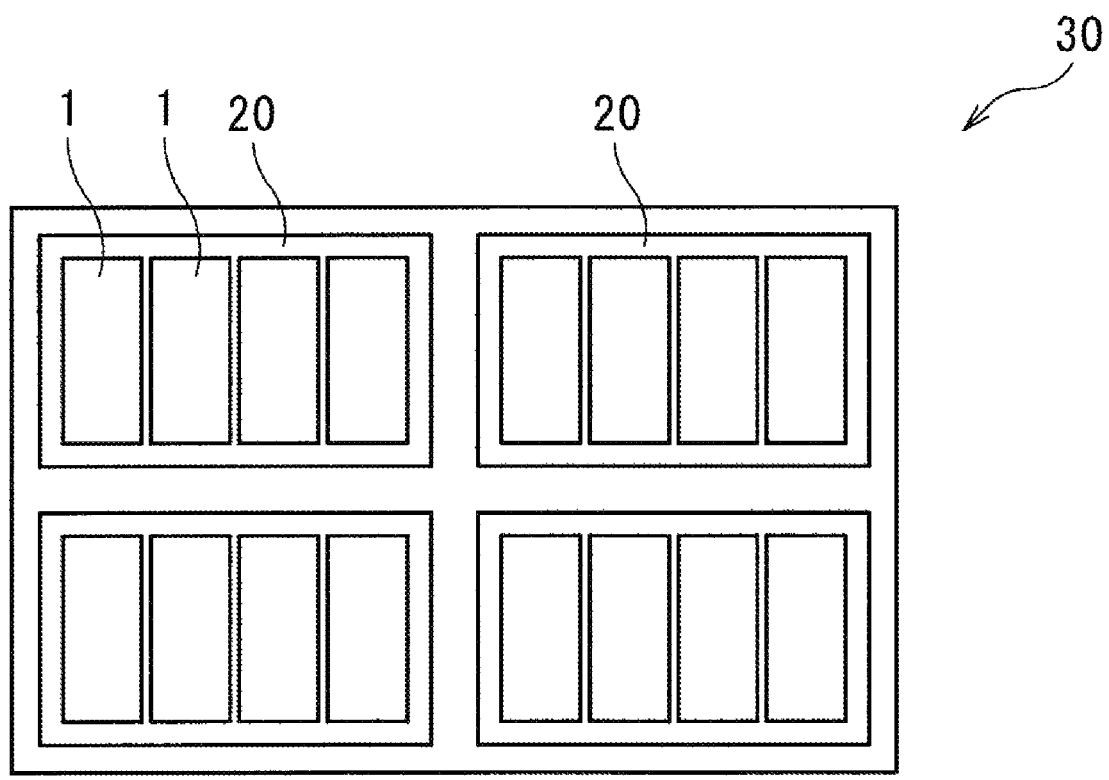
FIG. 2 is a schematic view illustrating an energy storage apparatus configured by aggregating a plurality of energy storage devices according to one embodiment of the present invention.

FIG. 2 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1 and a busbar (not illustrated) for electrically connecting two or more energy storage units 20. The energy storage unit 20 or the energy storage apparatus 30 may include a state monitor (not illustrated) for monitoring the state of one or more energy storage devices.

EXAMPLES

Hereinafter, the present invention will be described more specifically by way of examples, but the present invention is not limited to the following examples.

Examples 1 to 8 and Comparative Examples 1 to 3

(Negative Electrode)

A negative composite paste containing a negative active material having a composition (content ratio to the total content of solid graphite particles and hollow graphite particles) as shown in Table 1, styrene-butadiene rubber as a binder, carboxymethyl cellulose as a thickener and water as a dispersion medium was prepared. A mass ratio of the negative active material, the binder, and the thickener was 97.8:1.0:1.2. A negative composite paste was applied onto both surfaces of a negative electrode substrate (surface roughness: 0.86 μm) formed of a 8 μm-thick copper foil and dried to form a negative active material layer. In this way, negative electrodes of Examples 1 to 8 and Comparative Examples 1 to 3 were obtained. Table 1 shows the physical property values of the negative active materials. The coating amount of the negative composite (obtained by evaporating the dispersion medium from the negative composite paste) per unit area of one surface after drying was set to 1.0 g/100 cm$^2$. In Examples 1 to 8 and Comparative Examples 1 to 3, pressing was performed at a pressure (linear pressure) of less than 5 kgf/mm using a roll press.

(Energy Storage Device)

A negative electrode as shown in Table 1, a positive electrode as described below, and a 21 μm-thick polyethylene separator were wound in a state of being stacked. In this way, energy storage devices of Examples 1 to 8 and Comparative Examples 1 to 3 were prepared. The positive electrode contains $LiNi_{0.6}Mn_{0.2}Co_{0.2}O_2$ as a positive active material, polyvinylidene fluoride (PVDF) as a binder, and acetylene black as a conductive agent, and a positive composite paste was prepared using n-methyl-2-pyrrolidone (NMP) as a dispersion medium. A mass ratio of the positive active material, the binder and the conductive agent was 94.5:4:1.5. The positive composite paste was applied to both surfaces of a 15 μm-thick positive electrode substrate formed of an aluminum foil, pressed, and dried to form a positive active material layer. The coating amount of the positive composite (obtained by evaporating the dispersion medium from the positive composite paste) per unit area of one surface after drying was set to 1.7 g/100 cm$^2$. Next, a nonaqueous electrolyte was obtained by dissolving $LiPF_6$ (1.2 mol/dm$^3$) in a nonaqueous solvent obtained by mixing ethylene carbonate (EC), dimethyl carbonate (DMC) and ethyl methyl carbonate (EMC) at a volume ratio of EC:DMC:EMC=30:35:35. The positive electrode and the negative electrode were laminated via a separator made of a polyethylene microporous film to produce an electrode assembly. The electrode assembly was housed into an aluminum prismatic container case, and a positive electrode terminal and a negative electrode terminal were attached. After the nonaqueous electrolyte was injected into the case (prismatic container can), the nonaqueous electrolyte was sealed to obtain the energy storage devices of Examples and Comparative Examples.

(Calculation of Area Ratio of Graphite Particles Excluding Voids in Particles)

The area ratio R of the graphite particles excluding voids in the particles was calculated by the above-described method.

(Measurement of Raman Spectrum)

The Raman spectrum of the obtained negative active material was measured by the above-described method. On the basis of the obtained Raman spectrum, the peak intensity of the G band and the peak intensity of the D band were determined by the above-described method, and the intensity ratio ($I_{D1}/I_{G1}$) was determined. The measurement results are shown in Table 1.

(Determination of Aspect Ratio)

The aspect ratio of the graphite particles was determined by the above-described method.

(Density of Negative Active Material Layer)

The density of the negative active material layer can be calculated from the following formula, where W (g/100 cm$^2$) is a coating amount of the negative composite and T (cm) is a thickness of the negative active material layer before charge-discharge as described later.

Density of negative active material layer (g/cm$^3$)=$W/(T\times100)$

[Evaluation]

(Discharge Capacity Per Volume of Negative Active Material Layer in Unpressed State)

The discharge capacity per volume (mAh/cm$^3$) of the negative active material layer in an unpressed state was measured by the following procedure.

The negative electrode plate prepared by the above-described method was used as a working electrode, metallic lithium was used as a counter electrode, and a nonaqueous electrolyte obtained by dissolving LiPF$_6$ (1.2 mol/L) in a nonaqueous solvent obtained by mixing EC, DMC and EMC at a volume ratio of 30:35:35 was used as an electrolyte solution to prepare an energy storage device, a charge-discharge test was conducted under the following conditions, and the amount of electricity at the third discharge (Li extraction reaction) was divided by the volume of the negative active material layer in an unpressed state.

Charge (Li storage reaction): Charge at constant current and constant voltage (CCCV) with a lower limit voltage of 10 mV, a current density of 2 mA/cm$^2$ and an end-of-charge current density of 0.04 mA/cm$^2$ Discharge (Li extraction reaction): Discharge at constant current (CC) with an upper limit voltage of 2.0 V and a current density of 2 mA/cm$^2$ (Expansion Ratio of Negative Active Material at Initial Charge)

The amount of expansion of the negative active material at initial charge was calculated by subtracting "average thickness of the negative active material layer before charge-discharge" from "average thickness of the negative active material at the initial charge" calculated by the following method, and the expansion ratio of the negative active material at initial charge was then determined.

(1) Measurement of Average Thickness of Negative Active Material Layer Before Charge-Discharge Ten samples of the negative electrode before preparation of the energy storage device, each of which has an area of 2 cm×1 cm, were prepared as measurement samples, and the thickness of each of the negative electrodes was measured using a high precision Digimatic™ Micrometer manufactured by Mitutoyo Corporation™

For each negative electrode, the thickness of the negative electrode was measured at five positions, and from the average value thereof, the thickness of the negative electrode substrate (8 μm) was subtracted to measure the thickness of the negative active material layer of one negative electrode before charge-discharge. The average value of the thicknesses of the negative active material layer before charge-discharge, which had been measured for the ten negative electrodes, was calculated, and defined as an average thickness of the negative active material layer (μm) before charge-discharge.

(2) Measurement of Average Thickness of Negative Active Material Layer at Initial Charge In measurement of the average thickness of the negative active material layer at initial charge, the average thickness of the negative active material layer (μm) at initial charge was measured in the same manner as in the measurement of the average thickness of the negative active material layer before charge-discharge except that the energy storage device of each of examples and comparative examples at initial charge was disassembled in a glove box filled with argon with a dew point value of −60° C. or lower, and the negative electrode washed with DMC was used as a measurement sample. The term "at initial charge" refers to a state in which the energy storage device of each of examples and comparative examples before charge-discharge is subjected to constant current constant voltage charge with a current density of 2 mA/cm$^2$, an end-of-charge current density of 0.04 mA/cm$^2$ and an upper limit voltage of 4.25 V.

(3) Expansion Ratio of Negative Active Material at Initial Charge

For each of Examples 1 to 8 and Comparative Examples 1 to 3, the amount of expansion of the negative active material at initial charge was calculated by subtracting "average thickness of the negative active material layer before charge-discharge" from average thickness of the negative active material layer at initial charge", and then divided by the average thickness of the negative active material layer before charge-discharge to determine the expansion ratio (%) of the negative active material at initial charge.

Figure 3:
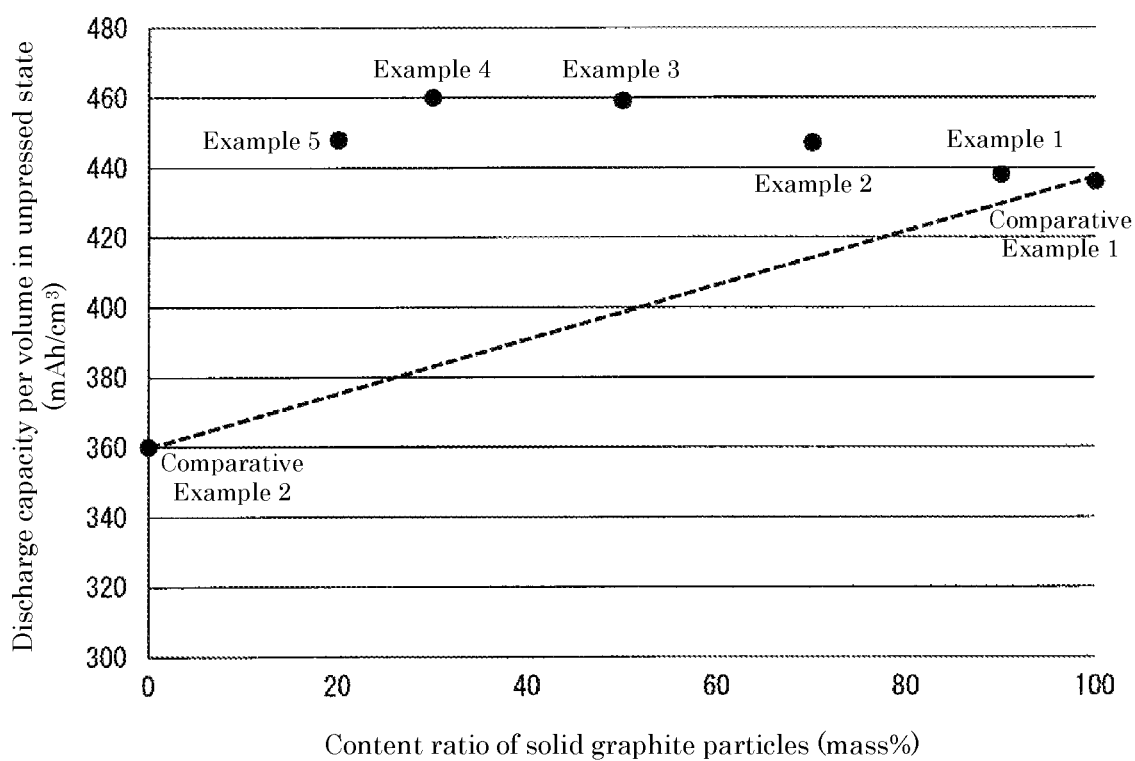
FIG. 3 is a graph showing a relationship between a content ratio of solid graphite particles and a discharge capacity per volume of a negative active material layer in Examples and Comparative Examples.
Figure 4:
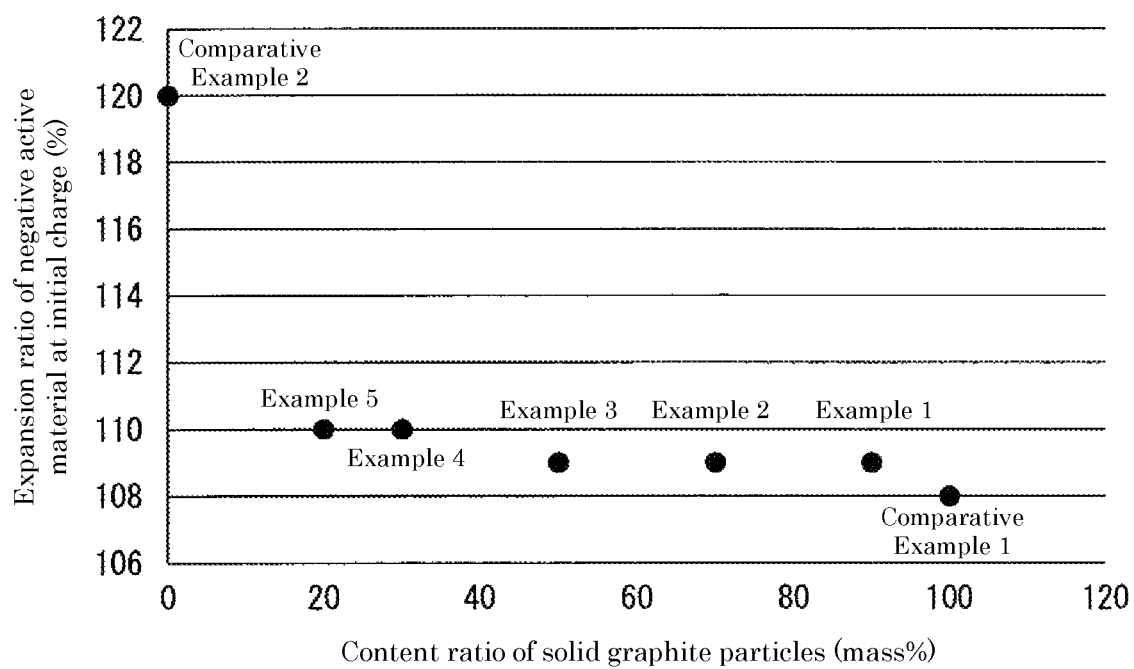
FIG. 4 is a graph showing a relationship between a content ratio of solid graphite particles and an expansion ratio of a negative active material layer at initial charge in Examples and Comparative Examples.

Table 1 shows the results of evaluating the negative electrodes of Examples 1 to 8 and Comparative Examples 1 to 3. In addition, for Examples 1 to 5 and Comparative Examples 1 to 2 in which solid graphite particles having a median diameter of 3 μm and hollow graphite particles having a median diameter of 8 μm were used, FIG. 3 shows a relationship between the content ratio (mass %) of the hollow graphite particles to the total content of the solid graphite particles and the hollow graphite particles and the discharge capacity (mAh/cm$^3$) per volume of the negative active material layer in an unpressed state, and FIG. 4 shows a relationship between the content ratio (mass %) of the hollow graphite particles to the total content of the solid graphite particles and the hollow graphite particles and the expansion ratio (%) of the negative active material at initial charge.

TABLE 1

| | Composition of negative active material | | Average particle diameter of graphite particles D50 (μm) | | Raman spectrum $I_{D1}/I_{G1}$ | | Aspect ratio of graphite particles | |
|---|---|---|---|---|---|---|---|---|
| | Content ratio of hollow graphite particles (mass %) | Content ratio of solid graphite particles (mass %) | Hollow graphite particles | Solid graphite particles | Hollow graphite particles | Solid graphite particles | Hollow graphite particles | Solid graphite particles |
| Comparative Example 1 | 0 | 100 | — | 3 | 0.21 | 0.3 | — | 2.7 |
| Example 1 | 10 | 90 | 8 | 3 | 0.21 | 0.3 | 1.5 | 2.7 |
| Example 2 | 30 | 70 | 8 | 3 | 0.21 | 0.3 | 1.5 | 2.7 |
| Example 3 | 50 | 50 | 8 | 3 | 0.21 | 0.3 | 1.5 | 2.7 |
| Example 4 | 70 | 30 | 8 | 3 | 0.21 | 0.3 | 1.5 | 2.7 |
| Example 5 | 80 | 20 | 8 | 3 | 0.21 | 0.3 | 1.5 | 2.7 |
| Comparative Example 2 | 100 | 0 | 8 | — | 0.21 | 0.3 | 1.5 | — |
| Example 6 | 30 | 70 | 14 | 3 | 0.21 | 0.3 | 1.2 | 2.7 |
| Example 7 | 50 | 50 | 14 | 3 | 0.21 | 0.3 | 1.2 | 2.7 |
| Example 8 | 70 | 30 | 14 | 3 | 0.21 | 0.3 | 1.2 | 2.7 |
| Comparative Example 3 | 50 | 50 | 8 | 20 | 0.21 | 0.3 | 1.5 | 1.1 |

| | Evaluation | | | | |
|---|---|---|---|---|---|
| | Density of negative active material layer (g/cm³) | Discharge capacity per volume in unpressed state (mAh/cm³) | Average thickness of negative active material layer before charge-discharge (μm) | Average thickness of negative active material layer initial at charge (μm) | Expansion ratio of negative active material at initial charge (%) |
| Comparative Example 1 | 1.42 | 436 | 109 | 118 | 108 |
| Example 1 | 1.42 | 438 | 109 | 119 | 109 |
| Example 2 | 1.42 | 447 | 109 | 119 | 109 |
| Example 3 | 1.42 | 459 | 109 | 119 | 109 |
| Example 4 | 1.42 | 460 | 109 | 120 | 110 |
| Example 5 | 1.42 | 448 | 109 | 120 | 110 |
| Comparative Example 2 | 1.42 | 360 | 109 | 131 | 120 |
| Example 6 | 1.42 | 443 | 109 | 119 | 109 |
| Example 7 | 1.42 | 452 | 109 | 119 | 109 |
| Example 8 | 1.42 | 451 | 109 | 120 | 110 |
| Comparative Example 3 | 1.42 | 340 | 109 | 129 | 118 |

As shown in Table 1 and the graphs of FIG. 3, the energy storage devices of Examples 1 to 5 in which the hollow graphite particles and the solid graphite particles having a median diameter smaller than the median diameter of the hollow graphite particles were used in combination had a larger discharge capacity per volume of the negative active material layer in an unpressed state as compared to Comparative Example 2 in which only the hollow graphite particles were used. The energy storage devices of Examples 1 to 5 had a larger discharge capacity per volume of the negative active material layer in an unpressed state as compared to the estimated value assumed from the approximate expression y=0.76 x+360 shown by the broken line of FIG. 3 in Comparative Example 2 in which only the hollow graphite particles were used and Comparative Example 1 in which only the solid graphite particles were used. For example, in Comparative Example 2 and Comparative Example 1 in which only the hollow graphite particles or the solid graphite particles were used, the discharge capacities per volume of the negative active material layer in an unpressed state are 360 mAh/cm³ and 436 mAh/cm³, respectively. Thus, in Example 3 in which the hollow graphite particles and the solid graphite particles were mixed at a ratio of 50:50, the discharge capacity per volume of the negative active material layer in an unpressed state is presumed to be about 0.76×50+360=398 mAh/cm³ from the approximate expression shown by the broken line of FIG. 3. On the other hand, in Example 3, the discharge capacity per volume of the negative active material layer in an unpressed state is 459 mAh/cm³. This value exceeds expectation. In addition, Comparative Example 3 in which the hollow graphite particles and the solid graphite particles having a median diameter larger than the median diameter of the hollow graphite particles were used in combination was inferior to Examples 1 to 8 in the discharge capacity per volume of the negative active material layer at the time in an unpressed state. These results reveal that by using hollow graphite particles in combination with solid graphite particles having a median diameter smaller than the median diameter of the hollow graphite particles, an energy storage device having a large discharge capacity per volume of the negative active material layer in an unpressed state can be provided.

In addition, as shown in Table 1 and FIG. 4, Examples 1 to 8 in which hollow graphite particles and solid graphite particles having a median diameter smaller than the median diameter of the hollow graphite particles were used in combination had a better suppressive effect on expansion of the negative active material layer at initial charge as compared with Comparative Example 2 in which only the hollow graphite particles were used.

As described above, the energy storage device including a negative electrode with a negative active material containing hollow graphite particles having a median diameter D1 and the solid graphite particles having a median diameter D2 smaller than the median diameter of the hollow graphite particles was shown to have a high discharge capacity per volume of the negative active material layer in an unpressed state.

INDUSTRIAL APPLICABILITY

The present invention is suitably used as an energy storage device including a nonaqueous electrolyte secondary battery used as a power source for electronic devices such as personal computers and communication terminals, automobiles, and the like.

DESCRIPTION OF REFERENCE SIGNS

1: Energy storage device
2: Electrode assembly
3: Case
4: Positive electrode terminal
4': Positive electrode lead
5: Negative electrode terminal
5': Negative electrode lead
20: Energy storage unit
30: Energy storage apparatus

The invention claimed is:

1. An energy storage device comprising a negative electrode including a negative electrode substrate and a negative active material layer stacked directly or indirectly on at least one surface of the negative electrode substrate,
the negative active material layer containing a negative active material,
the negative active material containing hollow graphite particles having a median diameter D1 and solid graphite particles having a median diameter D2 smaller than the median diameter of the hollow graphite particles,
wherein a content ratio of the hollow graphite particles to a total content of the hollow graphite particles and the solid graphite particles is 80 mass % or less.

2. The energy storage device according to claim 1, wherein the negative active material layer is not substantially pressed.

3. The energy storage device according to claim 1, wherein the negative active material layer has a density of 1.30 g/cm$^3$ or more and 1.55 g/cm$^3$ or less.

4. The energy storage device according to claim 1, wherein where Q1 is a surface roughness of a region of the negative electrode substrate on which the negative active material layer is stacked, and Q2 is a surface roughness of a region of the negative electrode substrate on which the negative active material layer is not stacked, a ratio Q2/Q1 of Q2 to Q1 is 0.90 or more.

5. The energy storage device according to claim 1, wherein the solid graphite particles have a median diameter of 4 μm or less.

6. The energy storage device according to claim 1, wherein the solid graphite particles have an aspect ratio of 1 or more and 5 or less.

7. The energy storage device according to claim 1, wherein a R value of the hollow graphite particles R1 is smaller than a R value of the solid graphite particles R2, the R value being a ratio of a peak intensity ($I_{D1}$) of a D band to a peak intensity ($I_{G1}$) of a G band ($I_{D1}/I_{G1}$) in a Raman spectrum.

8. The energy storage device according to claim 7, wherein the R value of the solid graphite particles (R2) and the R value of the hollow graphite particles (R1) satisfy a relationship of 1< (R2/R1)≤4.

* * * * *